United States Patent
Fang (10) Patent No.: US 10,013,012 B2
(45) Date of Patent: Jul. 3, 2018

(54) CONTROL METHOD AND APPARATUS

(71) Applicant: Huawei Technologies Co., Ltd., Shenzhen (CN)

(72) Inventor: Qingyin Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 14/793,414

(22) Filed: Jul. 7, 2015

(65) Prior Publication Data

US 2015/0309522 A1    Oct. 29, 2015

Related U.S. Application Data

(63) Continuation of application No. PCT/CN2013/085701, filed on Oct. 22, 2013.

(30) Foreign Application Priority Data

May 24, 2013    (CN) .......................... 2013 1 0198451

(51) Int. Cl.
| | |
|---|---|
| G05F 1/66 | (2006.01) |
| G05B 15/02 | (2006.01) |
| G05F 1/46 | (2006.01) |
| G06F 1/26 | (2006.01) |
| H02J 1/10 | (2006.01) |

(52) U.S. Cl.
CPC .............. G05F 1/66 (2013.01); G05B 15/02 (2013.01); G05F 1/46 (2013.01); G06F 1/263 (2013.01); H02J 1/102 (2013.01)

(58) Field of Classification Search
None
See application file for complete search history.

(56) References Cited

U.S. PATENT DOCUMENTS

| | | |
|---|---|---|
| 2009/0066165 A1 | 3/2009 | Luo et al. |
| 2012/0133355 A1 | 5/2012 | Hayakawa |

FOREIGN PATENT DOCUMENTS

| | | |
|---|---|---|
| CN | 1684359 A | 10/2005 |
| CN | 101969215 A | 2/2011 |

(Continued)

OTHER PUBLICATIONS

Foreign Communication From a Counterpart Application, Chinese Application No. 201310198451.6, Chinese Office Action dated Jun. 1, 2016, 9 pages.

(Continued)

*Primary Examiner* — Ryan Jarrett
(74) *Attorney, Agent, or Firm* — Conley Rose, P.C.

(57) ABSTRACT

A control method and apparatus are provided. The apparatus includes a switch module, a control module, and a power supply source conversion module, where the switch module includes at least two switches, each switch is connected to each control module, a high-level or low-level signal is provided for each control module by closing the switches; the control module controls, according to a state of each signal received by the control module, a power module to supply power to or power off a load, and when states of all received input signals are different, allows the power supply source conversion module to maintain a state of supplying power to the load, so that a power-supply or power-off operation on the load is easy and convenient and the state of supplying power to the load can still be maintained when a switch is faulty.

10 Claims, 9 Drawing Sheets

(56) References Cited

FOREIGN PATENT DOCUMENTS

| CN | 202126617 U | 1/2012 |
|---|---|---|
| CN | 103066690 A | 4/2013 |
| JP | 2010147570 A | 7/2010 |
| TW | 2009012624 A | 3/2009 |
| WO | 2006137112 A1 | 12/2006 |

OTHER PUBLICATIONS

Foreign Communication From a Counterpart Application, PCT Application No. PCT/CN2013/085701, English Translation of International Search Report dated Feb. 27, 2014, 2 pages.
Foreign Communication From a Counterpart Application, PCT Application No. PCT/CN2013/085701, Written Opinion dated Feb. 27, 2014, 3 pages.
Foreign Communication From a Counterpart Application, PCT Application No. PCT/CN2013/085701, English Translation of Written Opinion dated Feb. 27, 2014, 5 pages.
Teifel, J., "Self-Voting Dual-Modular-Redundancy Circuits for Single-Event-Transient Mitigation," IEEE Transactions on Nuclear Science, vol. 55, No. 6, Dec. 2008, pp. 3435-3439.
Foreign Communication From a Counterpart Application, European Application No. 13885307.2, Extended European Search Report dated Apr. 7, 2016, 10 pages.

When power needs to be supplied to a load, a first end of each switch in a switch module is grounded, and a second end is connected to a power supply source by using a pull-up resistor and is connected to at least one control module, each switch in the switch module is closed, to provide a low-level input signal for the control module; when power does not need to be supplied to the load, each switch in the switch module is opened, to provide a high-level input signal for the at least one control module; or when power needs to be supplied to a load, a first end of each switch in the switch module is connected to a power supply source, a second end is ground by using a pull-down resistor and is connected to the at least one control module, the at least two switches are closed, to provide a high-level input signal for the at least one control module; when power does not need to be supplied to the load, each switch in the switch module is opened, to provide a low-level input signal for the at least one control module

1001

The at least one control module receives an input signal sent by the switch module, and when all received input signals are low-level signals and the first ends of the at least two switches in the switch module are grounded; or when all received input signals are high-level signals and the first ends of the at least two switches in the switch module are connected to the power supply source, the power supply source conversion module is allowed to supply power to the load; or when states of all received input signals are different, the power supply source conversion module is allowed to maintain a state of supplying power to the load

CONTROL METHOD AND APPARATUS

CROSS-REFERENCE TO RELATED APPLICATIONS

This application is a continuation of International Application No. PCT/CN2013/085701, filed on Oct. 22, 2013, which claims priority to Chinese Patent Application No. 201310198451.6, filed on May 24, 2013, both of which are hereby incorporated by reference in their entireties.

TECHNICAL FIELD

The present invention relates to the field of communications technologies, and in particular, to a control method and apparatus.

BACKGROUND

A typical communications and information and communications technology (ICT) device includes power supply and distribution components (for example, a power entry module (PEM), a power module (PM), a service board, and a cooling fan). The power supply and distribution components are responsible for receiving power supply from outside of the device, and converting the power supply, input from outside of the device, to a power supply source that is applicable to loads (including the service board, the cooling fan, and the like) in the device. Generally, power supply input to a communications and ICT device includes several types: 220 volts (V) or 110 V alternating current, 48 V direct current, 240 V high voltage direct current (HVDC), and the like. Taking 220 V alternating current power supply as an example, a power supply and distribution module in a device receives 220 V alternating current input, and after completing processing, such as protective filtering, on the input power supply, converts the 220 V alternating current to a 12 V direct-current power supply source or a 48 V direct-current power supply source that is required by a back-end load.

Figure 1:
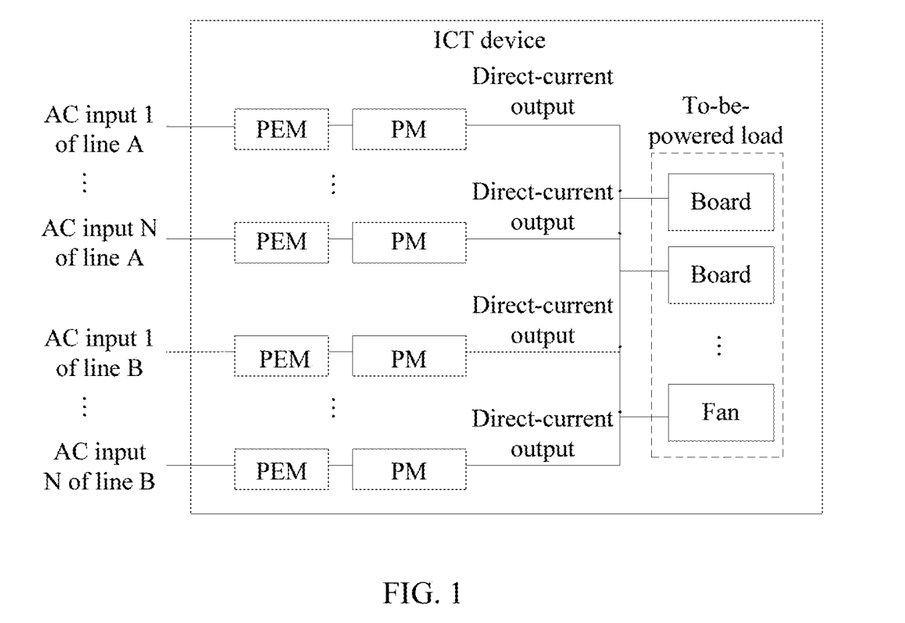
FIG. 1 is a schematic diagram of power supply of an existing typical communications and ICT device.

FIG. 1 is a schematic diagram of power supply of an existing typical communications and ICT device. As shown in FIG. 1, for convenience of maintaining a communications and ICT device by operation and maintenance personnel, generally, a power supply source control switch needs to be provided on the ICT device, and the operation and maintenance personnel may perform power-on and power-off operations on the entire device by using the control switch. A position of the switch may be on a PEM, and power supply input of the device may be directly cut off by using the switch, thereby powering off the device; or the switch may be provided on a PM, so that the PM cuts off power supply output to a load by using the switch. A disadvantage of this solution is that a high-power device has a large number of power supply circuits, and a switch needs to be added to each power supply input, so that there are many power supply switches, and it is also inconvenient to perform power-on and power-off operations on the device, thereby resulting in inconvenience in powering off the device in an emergency.

Figure 2:
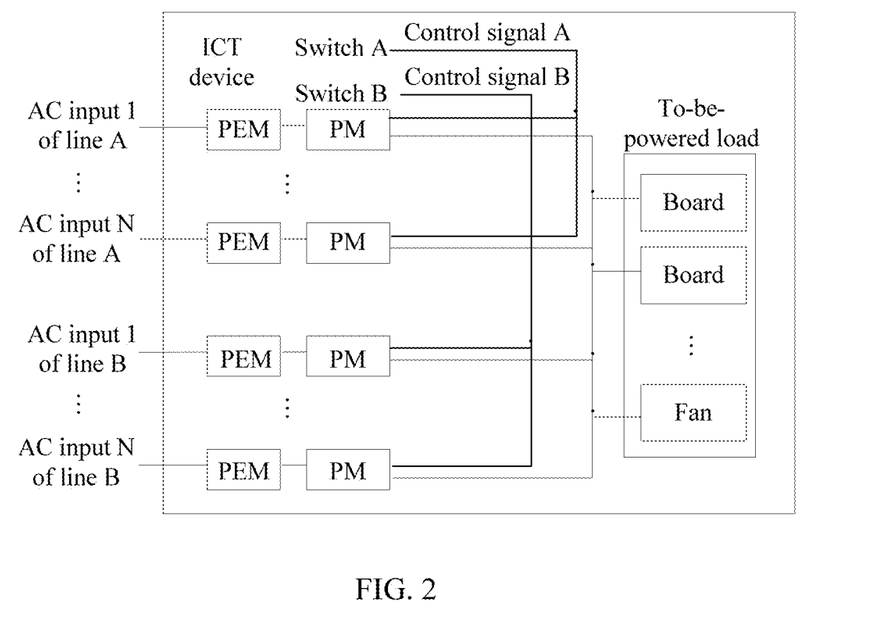
FIG. 2 is a schematic diagram of power supply of an existing backup-enabled communications and ICT device.

FIG. 2 is a schematic diagram of power supply of an existing backup-enabled communications and ICT device. As shown in FIG. 2, to improve reliability of a power-supply system, many existing high-end communications and ICT devices support equipment-room level dual-power-source backup, where signals on N channels of power supply sources A are input to the device, and similarly, signals on N channels of power supply sources B are also input to the device; and correspondingly, PMs in the device are of N+N backup. In this way, when an input power supply source is faulty or a single PM in the device is faulty, power supply to loads (including a service broad, a cooling fan, and the like) of the entire device is not interrupted. For the N+N backup power-supply system, two control switches may be used to implement on-off control of the entire device. A connection solution of the switches is as follows: control signal A corresponding to switch A is connected to N PMs corresponding to input source A; and control signal B corresponding to switch B is connected to the other N PMs corresponding to input source B. When switch A is switched to an ON state, and the corresponding N PMs connected to control signal A detect the control signal, the N PMs separately switch on power-supply output corresponding to the power supply source (that is, implement connections between power-supply output of the power modules and the loads). When switch A is switched to an OFF state, and the corresponding N PMs connected to control signal A detect the control signal, the N PMs separately switch off the power-supply output corresponding to the power supply source (that is, cut off the connections between the power-supply output of the power modules and the loads). Similarly, switches of the N power modules corresponding to input source B can also be controlled by using switch B. Therefore, when maintenance personnel need to power on the entire device, only switch A and switch B need to be switched to the ON state; and when the maintenance personnel need to power off the entire device, only switch A and switch B need to be switched to the OFF state. A disadvantage of this solution is that power supply modules of many systems of existing communications and ICT devices are of N+m backup (where m is less than N). This switch control solution may support the foregoing N+N backup device, but is not applicable to an N+m backup system. As shown in FIG. 2, switch A controls power modules 1 to N, and switch B controls power modules N+1 to N+m. Therefore, when switch A fails or a line corresponding to control signal A is faulty, output of the power modules 1 to N may be cut off, but the remaining power modules (N+1) to (N+m) of the system are not sufficient to supply power to loads of the device (because m is less than N), thereby resulting in power-off of the entire system.

SUMMARY

Embodiments of the present invention provide a control method and apparatus, which can make a power-supply or power-off operation on a load easy and convenient and can still maintain power supply to a load when any switch is faulty.

According to a first aspect, an embodiment of the present invention provides a control apparatus, where the apparatus includes a switch module, a control module, and a power supply source conversion module; where the switch module includes at least two switches, where first ends of the at least two switches are grounded, second ends are connected to a power supply source by using a pull-up resistor and are connected to at least one control module; when power needs to be supplied to a load, the at least two switches are closed, to provide a low-level input signal for the at least one control module; when power does not need to be supplied to the load, the at least two closed switches are opened, to provide a high-level input signal for the at least one control module; or first ends of the at least two switches are connected to a power supply source, second ends are ground by using a pull-down resistor and are connected to the at least one control module; when power needs to be supplied to a load, the at least two switches are closed, to provide a high-level input signal for the at least one control module; when power does not need to be supplied to the load, the at least two closed switches are opened, to provide a low-level input signal for the at least one control module; the control module, when all received input signals are low-level signals and the first ends of the at least two switches in the switch module are grounded; or when all the received input signals are high-level signals and the first ends of the at least two switches in the switch module are connected to the power supply source, allows the power supply source conversion module to supply power to the load; or when states of all received input signals are different, allows the power supply source conversion module to maintain a state of supplying power to the load; and the power supply source conversion module is connected to the control module and is configured to, according to an instruction of the control module, supply power or supply no power to the load.

With reference to the first aspect, in a first possible implementation manner, when the second ends of the at least two switches are connected to the power supply source by using the pull-up resistor and connected to the at least one control module, one diode is connected between the second ends of the at least two switches and each control module, to isolate the power supply source when the power supply source is faulty.

With reference to the first aspect, in a second possible implementation manner, when the second ends of the at least two switches are grounded by using the pull-down resistor and connected to the at least one control module, one current limiting resistor is connected between the second ends of the at least two switches and each control module, to alleviate an impact of a surge current on the control module.

With reference to the first aspect, in a third possible implementation manner, the control module is further configured to generate an alarm signal when the states of the received input signals are different.

With reference to the first aspect to the third possible implementation manner, in a fourth possible implementation manner, the control module is further configured to, when all the received input signals are high-level signals and the first ends of the at least two switches in the switch module are grounded; or when all the received input signals are low-level signals and the first ends of the at least two switches in the switch module are connected to the power supply source, allow the power supply source conversion module to power off the load.

According to a second aspect, an embodiment of the present invention provides a control method, where the method includes, when power needs to be supplied to a load, a first end of each switch in a switch module is grounded, and a second end is connected to a power supply source by using a pull-up resistor and is connected to at least one control module, closing each switch in the switch module, to provide a low-level input signal for control module; when power does not need to be supplied to the load, opening each switch in the switch module, to provide a high-level input signal for the at least one control module; or when power needs to be supplied to a load, a first end of each switch in the switch module is connected to a power supply source, a second end is ground by using a pull-down resistor and is connected to the at least one control module, closing the at least two switches, to provide a high-level input signal for the at least one control module; when power does not need to be supplied to the load, opening each switch in the switch module, to provide a low-level input signal for the at least one control module; receiving, by the at least one control module, an input signal sent by the switch module, and when all received input signals are low-level signals and the first ends of the at least two switches in the switch module are grounded; or when all received input signals are high-level signals and the first ends of the at least two switches in the switch module are connected to the power supply source, allowing the power supply source conversion module to supply power to the load; or when states of all received input signals are different, allowing the power supply source conversion module to maintain a state of supplying power to the load.

With reference to the second aspect, in a first possible implementation manner, the method further includes, when all the received input signals are high-level signals and the first end of any switch in the switch module is grounded; or when all the received input signals are low-level signals and the first end of any switch in the switch module is connected to the power supply source, controlling the power supply source conversion module to power off the load.

With reference to the second aspect, in a second possible implementation manner, the method further includes generating an alarm signal when the states of the received input signals are different.

In the embodiments of the present invention, a switch module and a control module are provided in a PM, where the switch module includes at least two switches, each switch is connected to each control module, a high-level or low-level signal is provided for each control module by closing the switches; the control module controls, according to a state of each signal received by the control module, a power module to supply power to or power off a load, and when states of all the received input signals are different, allows the power supply source conversion module to maintain a state of supplying power to the load, so that a power-supply or power-off operation on the load is easy and convenient and the state of supplying power to the load can still be maintained when a switch is faulty.

BRIEF DESCRIPTION OF THE DRAWINGS

FIG. 10 is a flowchart of a control method according to Embodiment 8 of the present invention.

DETAILED DESCRIPTION

To make the objectives, technical solutions, and advantages of the present invention clearer, the following further describes the embodiments of the present invention in detail with reference to the accompanying drawings.

The present invention relates to switches, and switches include positive logic switches and negative logic switches, so that to avoid misunderstanding, in the following embodiments, all switches are positive logic switches if not otherwise specified.

According to a control apparatus and method provided in the embodiments of the present invention, a switch module and a control module are provided in a PM, where the switch module includes at least two switches, each switch is connected to each control module, a high-level or low-level signal is provided for each control module by closing the switches; the control module controls, according to a state of each signal received by the control module, a power module to supply power to or power off a load, and when states of all the received input signals are different, allows the power supply source conversion module to maintain a state of supplying power to the load, so that a power-supply or power-off operation on the load is easy and convenient and the state of supplying power to the load can still be maintained when a switch is faulty.

Figure 3:
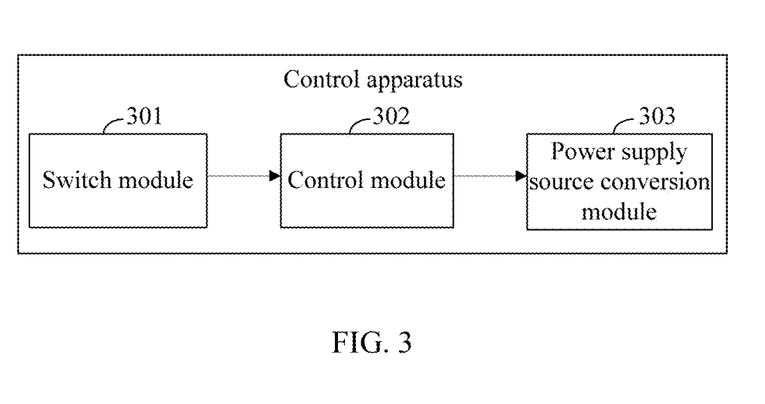
FIG. 3 is a schematic diagram of a control apparatus according to Embodiment 1 of the present invention.

FIG. 3 is a schematic diagram of a control apparatus according to Embodiment 1 of the present invention. As shown in FIG. 3, the apparatus provided in this embodiment of the present invention includes a switch module 301, a control module 302, and a power supply source conversion module 303.

The switch module 301 includes at least two switches, where first ends of the at least two switches are grounded, second ends are connected to a power supply source by using a pull-up resistor and are connected to at least one control module 302; when power needs to be supplied to a load, the at least two switches are closed, to provide a low-level input signal for the at least one control module 302, and when power does not need to be supplied to the load, the at least two closed switches are opened, to provide a high-level input signal for the at least one control module 302; or first ends of the at least two switches are connected to a power supply source, second ends are ground by using a pull-down resistor and are connected to the at least one control module 302; when power needs to be supplied to a load, the at least two switches are closed, to provide a high-level input signal for the at least one control module 302; when power does not need to be supplied to the load, the at least two closed switches are opened, to provide a low-level input signal for the at least one control module 302.

Generally, a power supply source VCC is an auxiliary control power supply source that is generated in a PM and generally has a voltage of 3.3 V or 5 V, or may be another power supply source.

The control module 302, when all received input signals are low-level signals and the first ends of the at least two switches in the switch module 301 are grounded; or when all received input signals are high-level signals and the first ends of the at least two switches in the switch module 301 are connected to the power supply source, allows the power supply source conversion module 303 to supply power to the load; or when states of all received input signals are different, allows the power supply source conversion module 303 to maintain a state of supplying power to the load.

The control module 302 is further configured to, when all the received input signals are high-level signals and the first ends of the at least two switches in the switch module 301 are grounded; or when all the received input signals are low-level signals and the first ends of the at least two switches in the switch module 301 are connected to the power supply source, allow the power supply source conversion module 303 to power off the load.

The control module 302 delivers a control signal to the power supply source conversion module 303 according to a detected signal state of an external switch, to implement on-off control of the PM. Generally, the control module 302 may be implemented by a single-chip microcomputer microprogrammed control unit (MCU), or may be implemented by a digital signal processor (DSP), or may be implemented by a digital programmable logic device.

The power supply source conversion module 303 mainly includes two functions: implementing power supply source input filtering and protection; converting an input power supply source (for example, 220 V alternating current (AC) to a target direct-current voltage (for example 48 V), and providing functions, such as on-off control, current equalization, and over-current protection, for a target direct-current output voltage.

The power supply source conversion module 303 is connected to the control module 302 and is configured to, according to an instruction of the control module 302, supply power or supply no power to the load.

It can be seen from the foregoing content that, there are two connection manners for the switches in the switch module. The following separately describes operating principles of the control apparatus in different switch connection manners by taking FIG. 4, FIG. 5, FIG. 6, FIG. 7, and FIG. 8, which include the specific switch connection manners, as examples.

Figure 4:
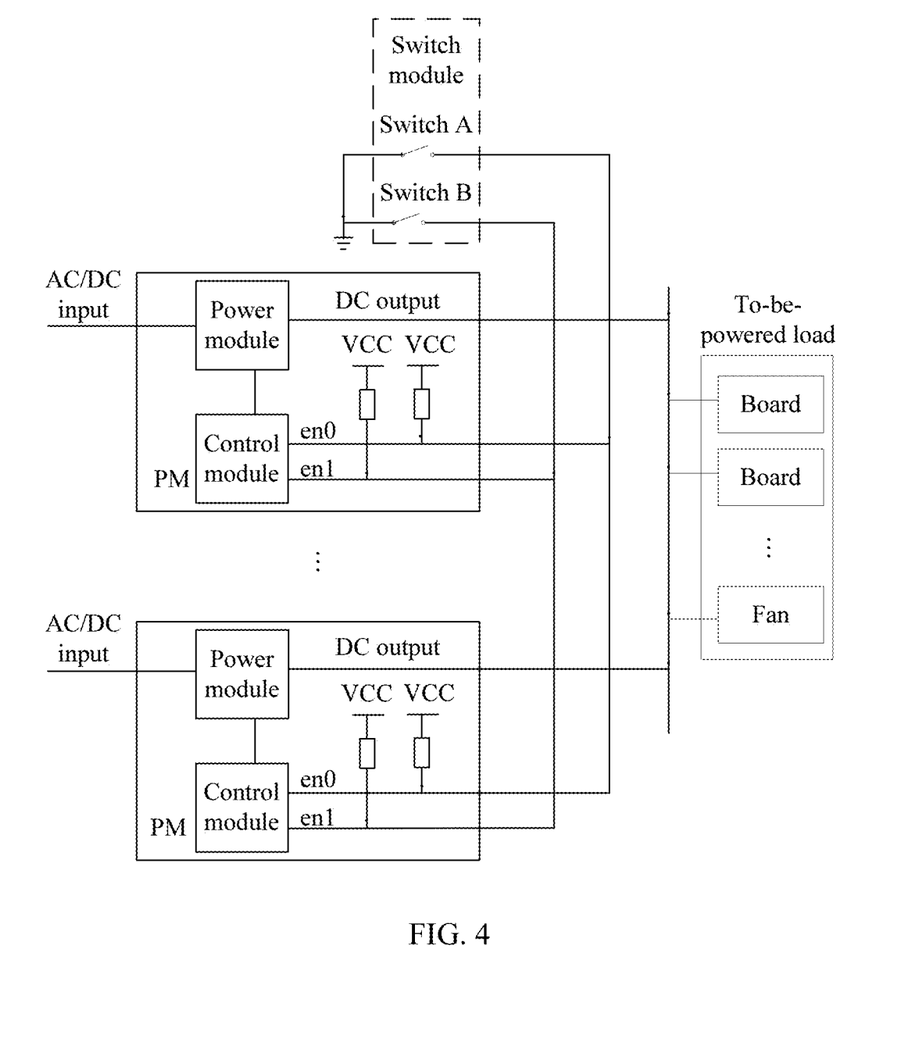
FIG. 4 is a schematic diagram of a control apparatus according to Embodiment 2 of the present invention.

FIG. 4 is a schematic diagram of a control apparatus according to Embodiment 2 of the present invention. As shown in FIG. 4, a switch module in FIG. 4 includes two control switches: switch A and switch B. A first end of switch A is connected to reference ground of a device, a second end is connected to one port (a port corresponding to a signal en0) of a control module in all PMs in the device, and the second end is connected to a reference power supply source VCC (a voltage of the VCC is generally 3.3 V or 5 V) by using a pull-up resistor, where a typical value of the pull-up resistor may be 4.7 kilo ohms (K ohms). A first end of switch B is connected to the reference ground of the device, a second end is connected to one port (a port corresponding to signal en1) of the control module in all the PMs in the device, and the second end is connected to the reference power supply source VCC (a voltage of the VCC is generally 3.3 V or 5 V) by using a pull-up resistor, where a typical value of the pull-up resistor may be 4.7K ohms. It can be seen that, because each switch is connected to the control module in each PM, backup of any number of PMs can be implemented.

When switch A is switched to an ON state, input signals en0 of all the control modules are low-level signals; and when switch A is switched to an OFF state, input signals en0 of all the control modules are at a high-level. Similarly, when switch B is switched to the ON state, input signals en0 of all the control modules are low-level signals; and when switch B is switched to the OFF state, input signals en0 of all the control modules are at a high-level. When detecting that en0 and en1 are both low-level signals, a control module in a PM controls a power supply source conversion module to enable the power supply source conversion module to supply power to a load; when detecting that en0 and en1 are both high-level signals, the control module allows the power supply source conversion module to power off the load. When states of switch A and switch B are different, that is, one switch is in the ON state, and the other switch is in the OFF state, the control module detects that level states of en0 and en1 are also different. In this case, the control module may generate a switch state alarm prompt signal, and to ensure reliability of power supply of the device, the control module enables, by sending a control signal, the power supply source conversion module to maintain power supply to the load of the device.

It should be noted that, if negative logic switches are applied to switch A and switch B, that is, when states of the switches are ON, the insides of the switches are in a disconnected state, en0 and en1 are high-level signals, and the control module enables, by sending a control signal, the power supply source conversion module to power off the load; when the states of the switches are OFF, the insides of the switches are in a connected state, en0 and en1 are low-level signals, and the control module allows, by sending a control signal, the power supply source conversion module to supply power to the load. For convenience of control, by means of internal setting by using a program, the control module may, when the switches are negative logic switches, and the states of the switches are ON, allow the power supply source conversion module to supply power to the load; when the switches are negative logic switches, and the states of the switches are OFF, allow the power supply source conversion module to power off the load. Therefore, no matter the switches are positive logic switches or negative logic switches, as long as the switches are on the ON state, a power module is controlled to supply power to the load, and as long as the switches are on the OFF state, the power module is controlled to power off the load, to facilitate a user operation.

According to the foregoing embodiment, first ends of switches are grounded, second ends are connected to a power supply source by using a pull-up resistor and are connected to each control module, different input signals are provided for the control module by closing or opening the switches, the control module allows, according to a state of each input signal received by the control module, a power supply source conversion module to supply power to or power off a load, so that a power-supply or power-off operation on the load is easy and convenient. Because there are at least two switches, a backup function can be achieved, and backup of any number of PMs can be implemented.

Preferably, based on the foregoing embodiments, a second end of each switch may be further connected to each of the control modules by using a diode D, so that when a fault occurs inside a single PM, the fault in the PM is isolated and does not spread to another PM.

Figure 5:
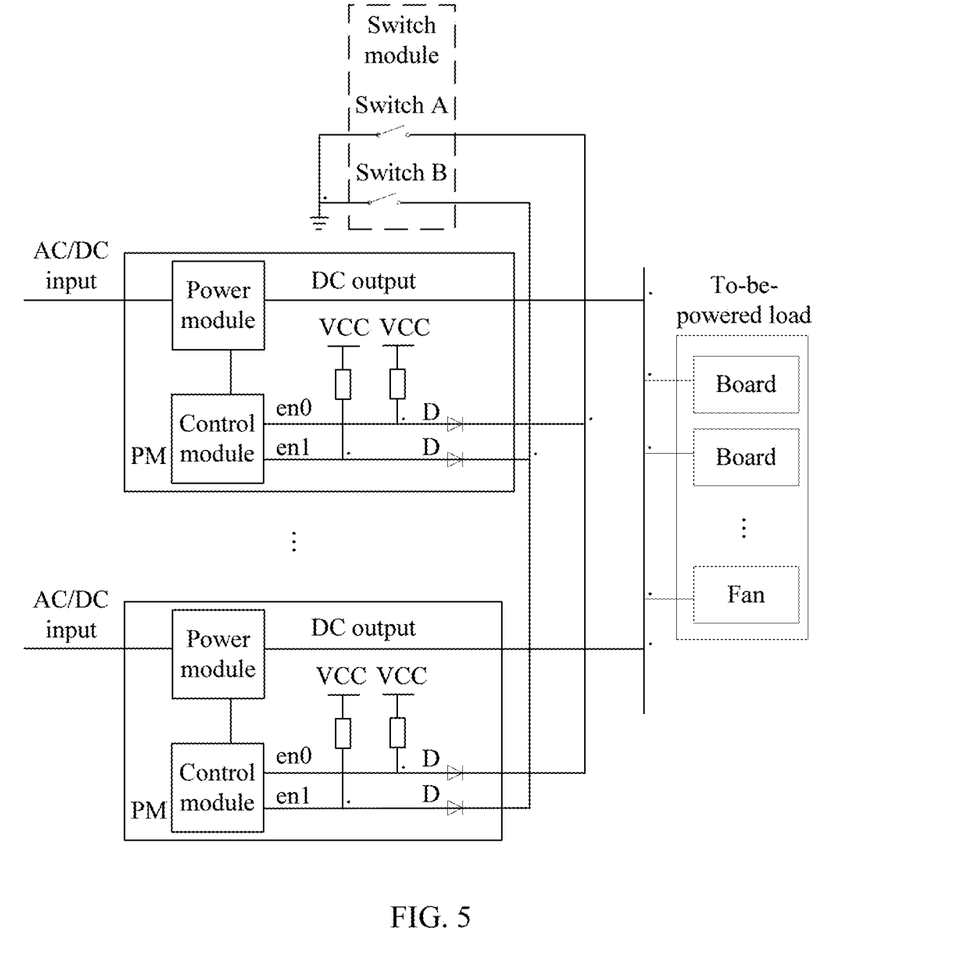
FIG. 5 is a schematic diagram of a control apparatus according to Embodiment 3 of the present invention.

FIG. 5 is a schematic diagram of a control apparatus according to Embodiment 3 of the present invention. As shown in FIG. 5, a main function of a diode D is to prevent an abnormality of an input signal en0 (or en1) of a control module in a single PM from affecting an input signal of a control module in another PM. If power does not need to be supplied to a load currently, switch A and switch B are both in a disconnected state, that is, input signals en0 and en1 of a control module in all PMs are high-level signals, and therefore, it may be controlled that no power is supplied to the load. However, if a line of one PM and corresponding to a signal en0 or a signal en1 encounters a ground short-circuit fault, an input signal en0 or en1 of the control module in the PM is a low-level signal, and therefore, the PM supplies power to the load. Contrary to a control requirement, if no diode D is connected in series in a circuit, because input ends of the control modules in all the PMs are equipotential, an input signal of a control module in another PM also becomes a low-level signal. In this case, all the PMs supply power to the load, so that power-off control cannot be performed on the load. If a diode D is connected in series in the circuit, although the input signal en0 or en1 of the control module in the PM is a low-level signal, the low-level signal is not transferred to an input end of a control module in another PM because the diode D in the circuit is not conductive, thereby isolating the faulty PM and ensuring that the another PM can still operate normally.

Figure 6:
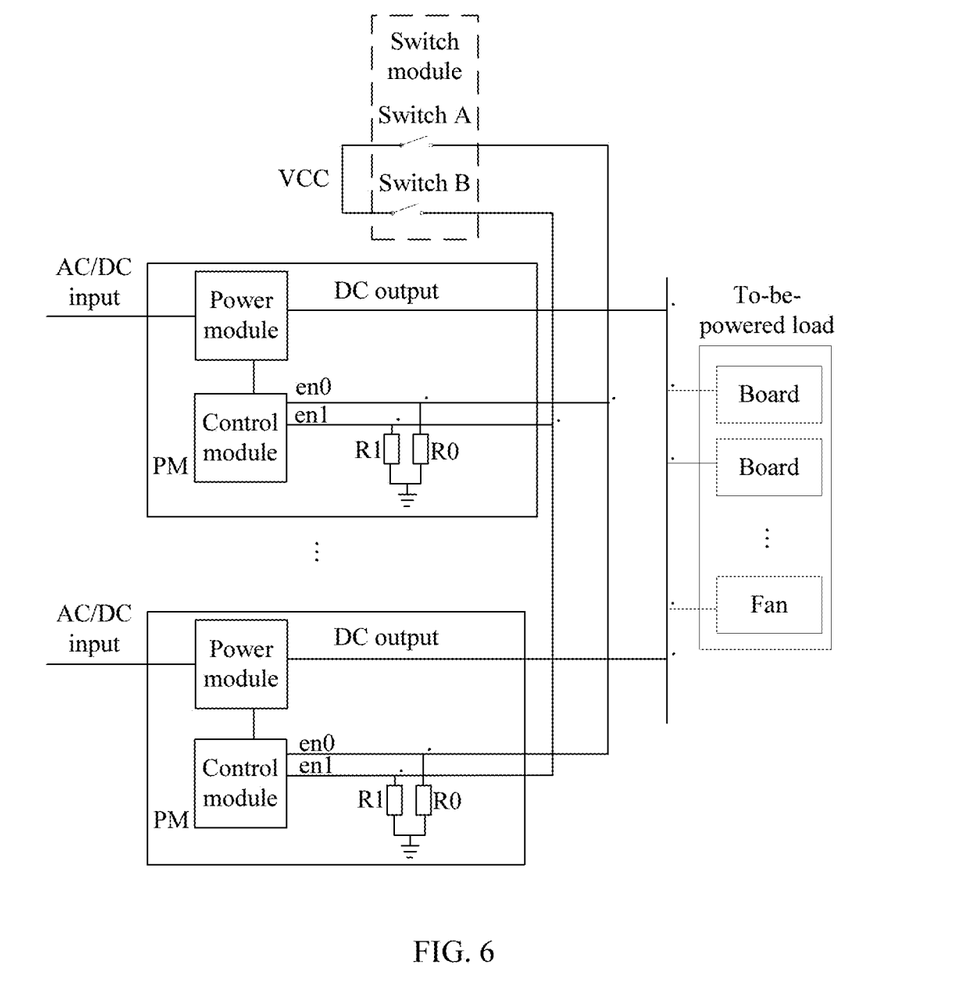
FIG. 6 is a schematic diagram of a control apparatus according to Embodiment 4 of the present invention.

The foregoing two embodiments describe the first switch connection manner, and the following embodiments describe the other connection manner. FIG. 6 is a schematic diagram of a control apparatus according to Embodiment 4 of the present invention. As shown in FIG. 6, a switch module includes two control switches: switch A and switch B. A first end of switch A is connected to a power supply source VCC (a voltage of the VCC is generally 3.3 V or 5 V), a second end is connected to one port (a port corresponding to a signal en0) of a control module in all PMs in a device, and the second end is grounded by using a pull-down resistor R0, where a typical value of the pull-down resistor R0 may be 4.7K ohms. A first end of switch B is connected to a power supply source VCC (a voltage of the VCC is generally 3.3 V or 5 V), a second end is connected to one port (a port corresponding to en1) of a control module in all the PMs in the device, and the second end is grounded by using a pull-down resistor R1, where a typical value of the pull-down resistor R1 may be 4.7K ohms. It can be seen that, because each switch is connected to a control module in each PM, a power supply source switch of a system with backup of any number of PMs can be controlled.

When switch A is switched to an ON state, input signals en0 of all the control modules are high-level signals; and when switch A is switched to an OFF state, input signals en0 of all the control modules are low-level signals. Similarly, when switch B is switched to the ON state, input signals en1 of all the control modules are high-level signals; and when switch B is switched to the OFF state, input signals en1 of all the control modules are low-level signals. When detecting that en0 and en1 are both high-level signals, a control module in a PM controls a power supply source conversion module to enable the power supply source conversion module to supply power to a load; when detecting that the en0 and en1 are both low-level signals, the control module allows the power supply source conversion module to power off the load. When states of switch A and switch B are different, that is, one switch is in the ON state, and the other switch is in the OFF state. In this case, a control module detects that level states of en0 and en1 are also different, the control module may generate a switch state alarm prompt signal, and to ensure reliability of power supply of the device, the control module enables, by sending a control signal, the power supply source conversion module to maintain power supply to the load of the device.

It should be noted that, if negative logic switches are applied to switch A and switch B, that is, when states of the switches are ON, the insides of the switches are in a disconnected state, en0 and en1 are low-level signals, and the control module enables, by sending a control signal, the power supply source conversion module to power off the load; when the states of the switches are OFF, the insides of the switches are in a connected state, en0 and en1 are high-level signals, the control module allows, by sending a control signal, the power supply source conversion module to supply power to the load. For convenience of control, by means of internal setting by using a program, the control module may, when the switches are negative logic switches, and the states of the switches are ON, allow the power supply source conversion module to supply power to the load; when the switches are negative logic switches, and the states of the switches are OFF, allow the power supply source conversion module to power off the load. Therefore, no matter the switches are positive logic switches or negative logic switches, as long as the switches are on the ON state, a power module is controlled to supply power to the load, and as long as the switches are on the OFF state, the power module is controlled to power off the load, to facilitate a user operation.

According to the foregoing embodiment, a switch module and a control module are provided in a PM, where the switch module includes at least two switches, each switch is connected to each control module, a high-level or low-level signal is provided for each control module by closing the switches; the control module controls, according to a state of each signal received by the control module, a power module to supply power to or power off a load, and when states of all received input signals are different, allows the power supply source conversion module to maintain a state of supplying power to the load, so that a power-supply or power-off operation on the load is easy and convenient and the state of supplying power to the load can still be maintained when a switch is faulty.

Preferably, based on the foregoing embodiments, a second end of each switch may be further connected to each of the control modules by using a diode D, so that when a fault occurs inside a single PM, the fault in the PM is isolated and does not spread to another PM.

Figure 7:
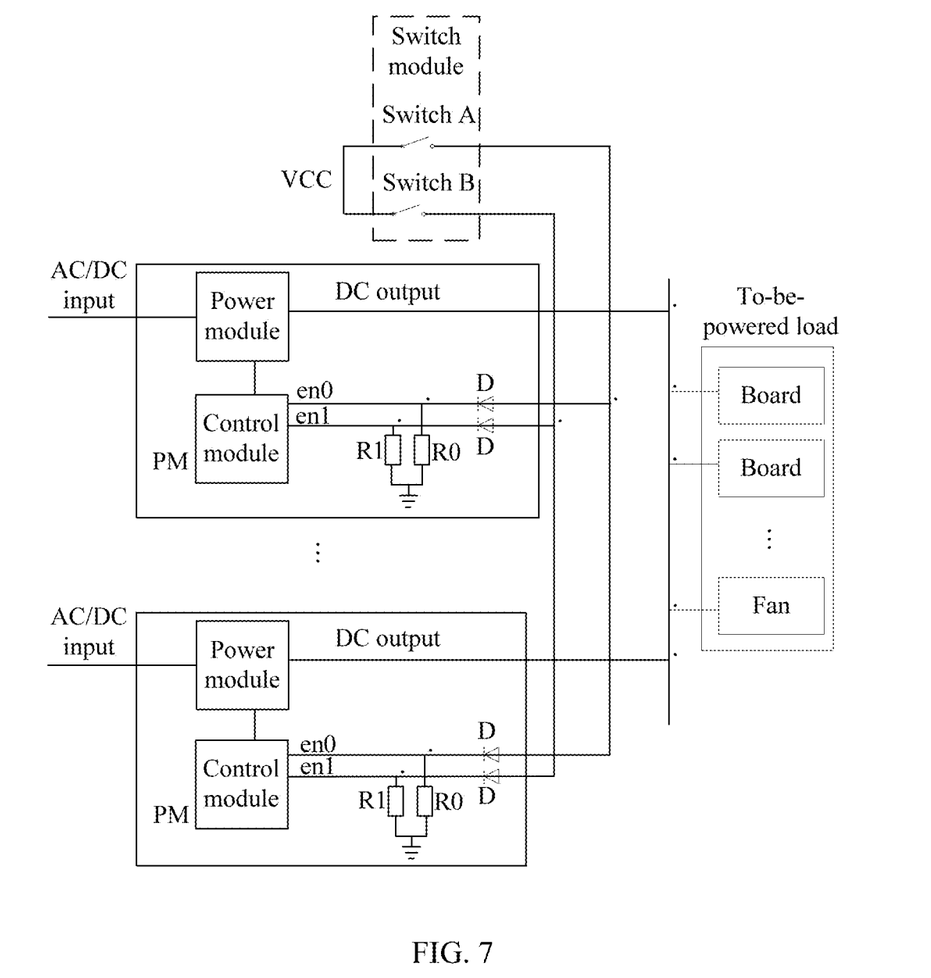
FIG. 7 is a schematic diagram of a control apparatus according to Embodiment 5 of the present invention.

FIG. 7 is a schematic diagram of a control apparatus according to Embodiment 5 of the present invention. As shown in FIG. 7, a main function of a diode D is to prevent an abnormality of an input signal en0 (or en1) of a control module in a single PM from affecting an input signal of a control module in another PM. A working principle of the diode is the same as that in the foregoing Embodiment 3, and is not described herein again.

Preferably, based on the foregoing Embodiment 4 or 5, a second end of each switch may be further connected to each of the control modules by using a resistor R1, which is used to alleviate an impact of a surge current on the control module. The following brief description is provided by using Embodiment 4 (corresponding to FIG. 6) as an example.

Figure 8:
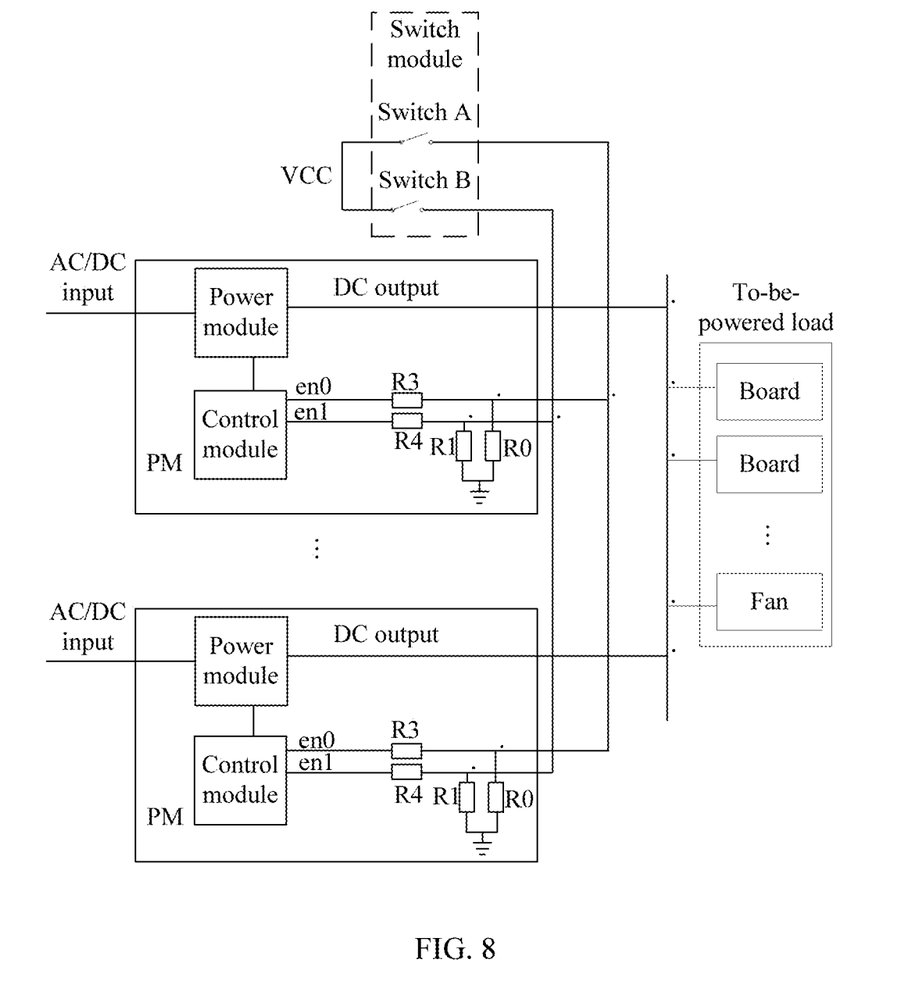
FIG. 8 is a schematic diagram of a control apparatus according to Embodiment 6 of the present invention.

FIG. 8 is a schematic diagram of a control apparatus according to Embodiment 6 of the present invention. As shown in FIG. 8, if switch A or switch B is closed, a surge current flows though a control module immediately, which may damage the control module. If resistors R3 and R4 are connected in series, the resistors R3 and R4 divide a voltage of a power supply source VCC, to reduce a transient impulse current, thereby achieving a function of protecting the control module.

Figure 9:
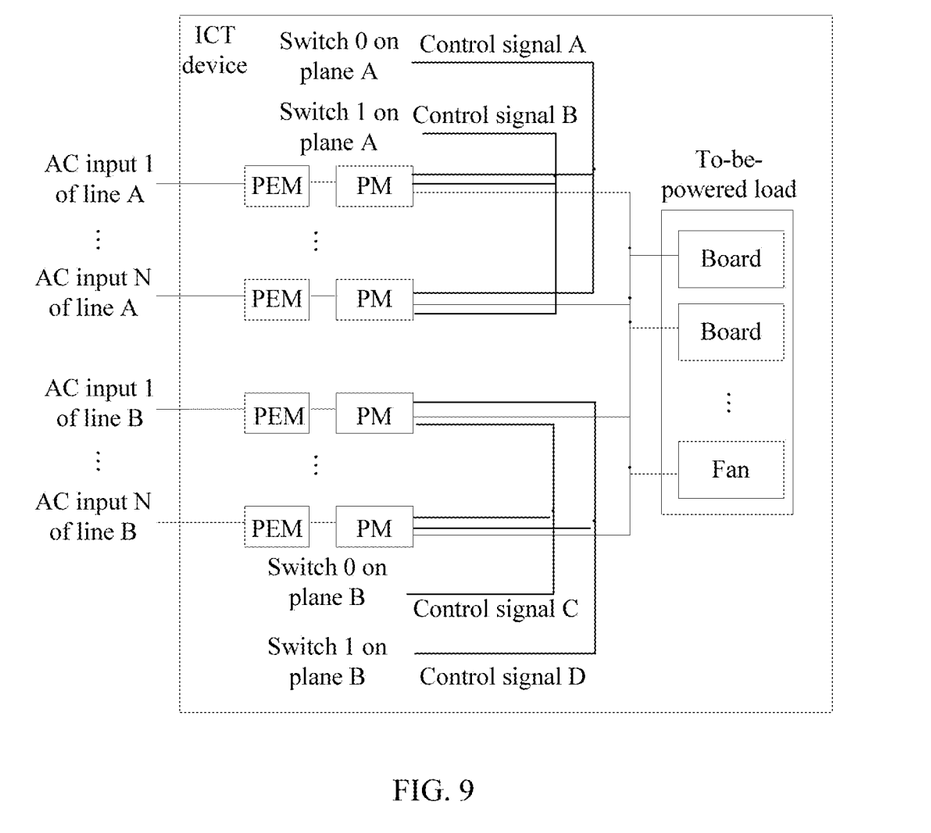
FIG. 9 is a schematic diagram of a control apparatus according to Embodiment 7 of the present invention.

It should be noted that, in all the foregoing embodiments, a switch module includes two switches, or there may be at least two switches. FIG. 9 is a schematic diagram of a control apparatus according to Embodiment 7 of the present invention. As shown in FIG. 9, for an existing system including two planes: A and B, a single switch of each plane may be modified to dual switches, and the connection manners described in the foregoing embodiments may be applied to the switches, which is not described herein again.

The foregoing embodiments describe the control apparatus, and the following embodiment describes a control method. FIG. 10 is a flowchart of a control method according to Embodiment 8 of the present invention. As shown in FIG. 10, the method provided in this embodiment of the present invention includes the following.

S1001: When power needs to be supplied to a load, a first end of each switch in a switch module is grounded, and a second end is connected to a power supply source by using a pull-up resistor and is connected to at least one control module, each switch in the switch module is closed, to provide a low-level input signal for the control module; when power does not need to be supplied to the load, each switch in the switch module is opened, to provide a high-level input signal for the at least one control module; or when power needs to be supplied to a load, a first end of each switch in the switch module is connected to a power supply source, a second end is ground by using a pull-down resistor and is connected to the at least one control module, the at least two switches are closed, to provide a high-level input signal for the at least one control module; when power does not need to be supplied to the load, each switch in the switch module is opened, to provide a low-level input signal for the at least one control module.

S1002: The at least one control module receives an input signal sent by the switch module, and when all received input signals are low-level signals and the first ends of the at least two switches in the switch module are grounded; or when all received input signals are high-level signals and the first ends of the at least two switches in the switch module are connected to the power supply source, the power supply source conversion module is allowed to supply power to the load; or when states of all received input signals are different, the power supply source conversion module is allowed to maintain a state of supplying power to the load.

The method further includes, when all the received input signals are high-level signals and the first end of any switch in the switch module is grounded; or when all the received input signals are low-level signals and the first end of any switch in the switch module is connected to the power supply source, controlling the power supply source conversion module to power off the load.

The method further includes generating an alarm signal when the states of the received input signals are different.

It should be noted that, the method provided in this embodiment of the present invention is applied to the apparatus provided in the foregoing embodiments, and therefore, a connection relationship of switches in a circuit is not described herein again.

According to the foregoing embodiment, a switch module and a control module are provided in a PM, where the switch module includes at least two switches, each switch is connected to each control module, a high-level or low-level signal is provided for each control module by closing the switches; the control module controls, according to a state of each signal received by the control module, a power module to supply power to or power off a load, and when states of all received input signals are different, allows the power supply source conversion module to maintain a state of supplying power to the load, so that a power-supply or power-off operation on the load is easy and convenient and the state of supplying power to the load can still be maintained when a switch is faulty.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc-ROM (CD-ROM), or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A control apparatus, comprising:
a switch module;
at least one control module; and
a power supply source conversion module,
wherein the switch module comprises at least two switches,
wherein first ends of the at least two switches are grounded,
wherein second ends of the at least two switches are connected to a power supply source by using a pull-up resistor and are connected to the at least one control module,
wherein the at least two switches are configured to be closed to provide a low-level input signal to the at least one control module,
wherein the at least two switches are configured to be opened to provide a high-level input signal to the at least one control module, and
wherein the control module is configured to:
instruct the power supply source conversion module to supply power to a load in response to receipt of the low-level input signal only;
instruct the power supply source conversion module not to supply the power to the load in response to receipt of the high-level input signal only; and
instruct the power supply source conversion module to maintain a state of supplying the power to the load in response to receipt of the low-level input signal from one of the at least two switches and receipt of the high-level input signal from another of the at least two switches.

2. The control apparatus according to claim 1, wherein one diode is connected between the second ends of the at least two switches and the at least one control module to isolate the power supply source from a fault in the power supply source.

3. The control apparatus according to claim 1, wherein the control module is further configured to generate an alarm signal in response to receipt of both the low-level input signal and the high-level input signal at the same time.

4. A control method implemented by a control apparatus, comprising:
closing each switch in a switch module to provide a low-level input signal to at least one control module, wherein a first end of each switch is grounded, and wherein a second end of each switch is connected to a power supply source by using a pull-up resistor and is connected to at least one control module;
opening each switch in the switch module to provide a high-level input signal to the at least one control module;
instructing a power supply source conversion module in the control apparatus to supply power to a load in response to receipt of the low-level input signal only by the at least one control module;
instructing the power supply source conversion module in the control apparatus not to supply the power to the load in response to receipt of the high-level input signal only by the at least one control module; and
instructing the power supply source conversion module in the control apparatus to maintain a state of supplying the power to the load in response to receipt of the low-level input signal from one of the at least two switches and the high-level input signal from another of the at least two switches by the at least one control module.

5. The control method according to claim 4, wherein the method further comprises controlling the power supply source conversion module to power off the load.

6. The control method according to claim 4, wherein the method further comprises generating an alarm signal when both the low-level input signal and the high-level input signal are received by the at least one control module at the same time.

7. A control apparatus, comprising:
a switch module;
at least one control module; and
a power supply source conversion module,
wherein the switch module comprises at least two switches,
wherein first ends of the at least two switches are connected to a power supply source,
wherein second ends of the at least two switches are connected to ground by using a pull-down resistor and are connected to the at least one control module,
wherein the at least two switches are configured to be closed to provide a high-level input signal to the at least one control module,
wherein the at least two closed switches are configured to be opened to provide a low-level input signal for the at least one control module, and
wherein the control module is configured to:
instruct the power supply source conversion module to supply power to a load in response to receipt of the high-level input signal only;
instruct the power supply source conversion module not to supply the power to the load in response to receipt of the low-level input signal only; and
instruct the power supply source conversion module to maintain a state of supplying the power to the load in response to receipt of the low-level input signal from one of the at least two switches and the high-level input signal from another of the at least two switches.

8. The control apparatus according to claim 7, wherein one current limiting resistor is connected between the second ends of the at least two switches and the at least one control module to alleviate an impact of a surge current on the control module.

9. The control apparatus according to claim 7, wherein the control module is further configured to generate an alarm signal in response to receipt of both the low-level input signal and the high-level input signal at the same time.

10. A control method implemented in a control apparatus, comprising:

closing each switch in a switch module to provide a high-level input signal to at least one control module, wherein a first end of each switch is connected to a power supply source, and wherein a second end of each switch is connected to a ground by using a pull-down resistor and is connected to at least one control module;

opening each switch in the switch module to provide a low-level input signal to the at least one control module;

instructing a power supply source conversion module in the control apparatus to supply power to a load in response to receipt of the low-level input signal only by the at least one control module;

instructing the power supply source conversion module in the control apparatus not to supply the power to the load in response to receipt of the high-level input signal only by the at least one control module; and     instructing the power supply source conversion module in the control apparatus to maintain a state of supplying the power to the load in response to receipt of the low-level input signal from one of the at least two switches and the high-level input signal from another of the at least two switches by the at least one control module.

\* \* \* \* \*

UNITED STATES PATENT AND TRADEMARK OFFICE
CERTIFICATE OF CORRECTION

PATENT NO. : 10,013,012 B2
APPLICATION NO. : 14/793414
DATED : July 3, 2018
INVENTOR(S) : Qingyin Fang Page 1 of 1

It is certified that error appears in the above-identified patent and that said Letters Patent is hereby corrected as shown below:

On the Title Page

Item (30), Line 1: "201310198451" should be "201310198451.6"

Signed and Sealed this
Twenty-eighth Day of August, 2018

Andrei Iancu
*Director of the United States Patent and Trademark Office*